US011116320B2

(12) United States Patent
Morales et al.

(10) Patent No.: US 11,116,320 B2
(45) Date of Patent: Sep. 14, 2021

(54) COLLAPSIBLE CHAIR AND SOLAR PANEL SHADE CHARGER SYSTEM

(71) Applicants: Nilo Morales, Miami, FL (US); Jorge R. Vargas, Miami, FL (US); Jorge G. Vargas Solis, Miami, FL (US)

(72) Inventors: Nilo Morales, Miami, FL (US); Jorge R. Vargas, Miami, FL (US); Jorge G. Vargas Solis, Miami, FL (US)

( * ) Notice: Subject to any disclaimer, the term of this patent is extended or adjusted under 35 U.S.C. 154(b) by 275 days.

(21) Appl. No.: 16/249,244

(22) Filed: Jan. 16, 2019

(65) Prior Publication Data
US 2020/0221876 A1 Jul. 16, 2020

(51) Int. Cl.
| | | |
|---|---|---|
| A47C 4/28 | (2006.01) | |
| A47C 7/62 | (2006.01) | |
| A47C 7/72 | (2006.01) | |
| A47C 7/66 | (2006.01) | |
| H02S 40/30 | (2014.01) | |
| H02S 99/00 | (2014.01) | |
| H02S 20/30 | (2014.01) | |

(52) U.S. Cl.
CPC .............. *A47C 7/72* (2013.01); *A47C 4/28* (2013.01); *A47C 4/286* (2013.01); *A47C 7/624* (2018.08); *A47C 7/626* (2018.08); *A47C 7/66* (2013.01); *H02S 20/30* (2014.12); *H02S 40/30* (2014.12); *H02S 99/00* (2013.01)

(58) Field of Classification Search
CPC .. A47C 4/28; A47C 4/286; A47C 4/52; A47C 7/624; A47C 7/626; A47C 7/66; A47C 7/72
See application file for complete search history.

(56) References Cited

U.S. PATENT DOCUMENTS

| | | | |
|---|---|---|---|
| 7,431,389 B2 * | 10/2008 | Reeb ................... | A47C 1/0265 297/184.15 |
| 8,002,349 B1 | 8/2011 | Pizzuto | |
| 8,465,090 B1 * | 6/2013 | O'Connor ............... | A47C 7/62 297/45 |
| 8,795,015 B1 * | 8/2014 | Nguyen .................. | B63B 34/50 441/129 |
| 9,101,222 B2 * | 8/2015 | Minkoff ................. | A47C 7/744 |
| 9,185,982 B2 * | 11/2015 | Kilzer ...................... | A47C 7/72 |
| 9,185,988 B1 * | 11/2015 | Sanchez ................... | A47C 7/72 |
| 9,220,347 B2 * | 12/2015 | Lovley, II .............. | A47C 4/286 |
| 9,339,114 B2 | 5/2016 | Strolka | |

(Continued)

FOREIGN PATENT DOCUMENTS

| | | | |
|---|---|---|---|
| CN | 105852471 A | * | 8/2016 |
| CN | 107485201 A | * | 12/2017 |
| WO | WO2017088535 | | 6/2017 |

*Primary Examiner* — Ryan D Kwiecinski

(57) ABSTRACT

A collapsible chair and solar panel shade charger system for creating shade and charging personal electronic devices includes a chair having a seat bottom, a seat back, a pair of arms, and a plurality of legs. A mounting means is foldably coupled to the seat back of the chair. A sun shade is coupled to the mounting means and has a top side and a bottom side. A solar panel is coupled to the top side of the mounting means. A charger housing is coupled to the chair. A plurality of ports is coupled to the charger housing and is in operational communication with the solar panel. The plurality of ports is configured to receive a plurality of charging cables to charge personal electronic devices.

8 Claims, 5 Drawing Sheets

(56) References Cited

U.S. PATENT DOCUMENTS

| | | | | |
|---|---|---|---|---|
| 9,578,972 | B2* | 2/2017 | Purintun | A47C 7/727 |
| 9,808,087 | B1 | 11/2017 | Ghazal | |
| 10,463,157 | B1* | 11/2019 | Liniado | A47C 4/28 |
| 2007/0096004 | A1 | 5/2007 | Quiambao | |
| 2011/0284045 | A1* | 11/2011 | Reeb | A45B 11/00 |
| | | | | 135/151 |
| 2012/0211038 | A1* | 8/2012 | Pirshafiey | A47C 7/72 |
| | | | | 135/96 |
| 2014/0265462 | A1* | 9/2014 | Fleming | A47C 7/66 |
| | | | | 297/180.14 |
| 2018/0000252 | A1 | 1/2018 | Weldon | |
| 2019/0335704 | A1* | 11/2019 | Burkhart | A01K 1/03 |
| 2019/0374033 | A1* | 12/2019 | Grace | A45F 3/14 |

\* cited by examiner

COLLAPSIBLE CHAIR AND SOLAR PANEL SHADE CHARGER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to chair accessories and more particularly pertains to a new chair accessory for creating shade and charging personal electronic devices.

BRIEF SUMMARY OF THE INVENTION

An embodiment of the disclosure meets the needs presented above by generally comprising a chair having a seat bottom, a seat back, a pair of arms, and a plurality of legs. A mounting means is foldably coupled to the seat back of the chair. A sun shade is coupled to the mounting means and has a top side and a bottom side. A solar panel is coupled to the top side of the mounting means. A charger housing is coupled to the chair. A plurality of ports is coupled to the charger housing and is in operational communication with the solar panel. The plurality of ports is configured to receive a plurality of charging cables to charge personal electronic devices.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
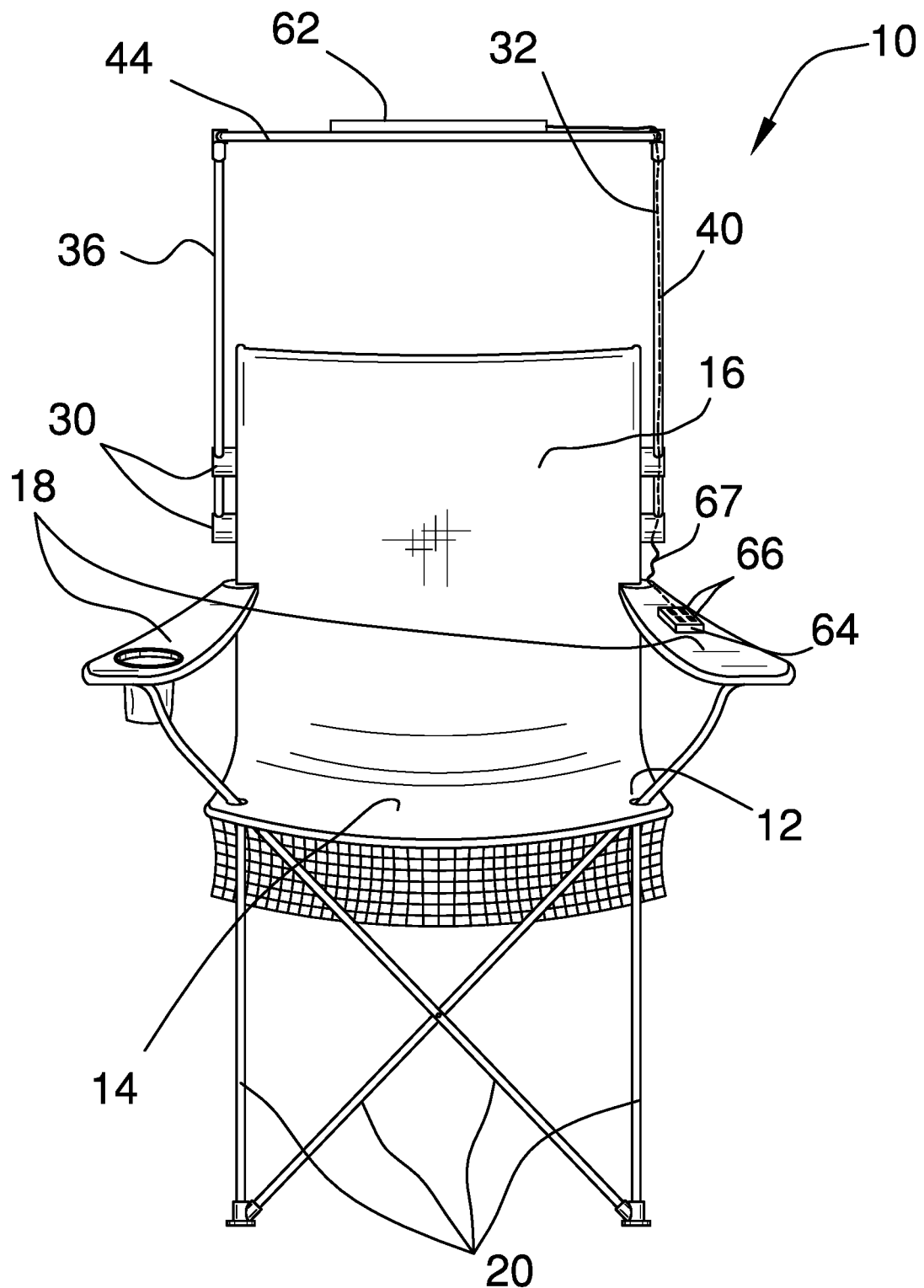
FIG. 1 is a front elevation view of a collapsible chair and solar panel shade charger system according to an embodiment of the disclosure.
Figure 2:
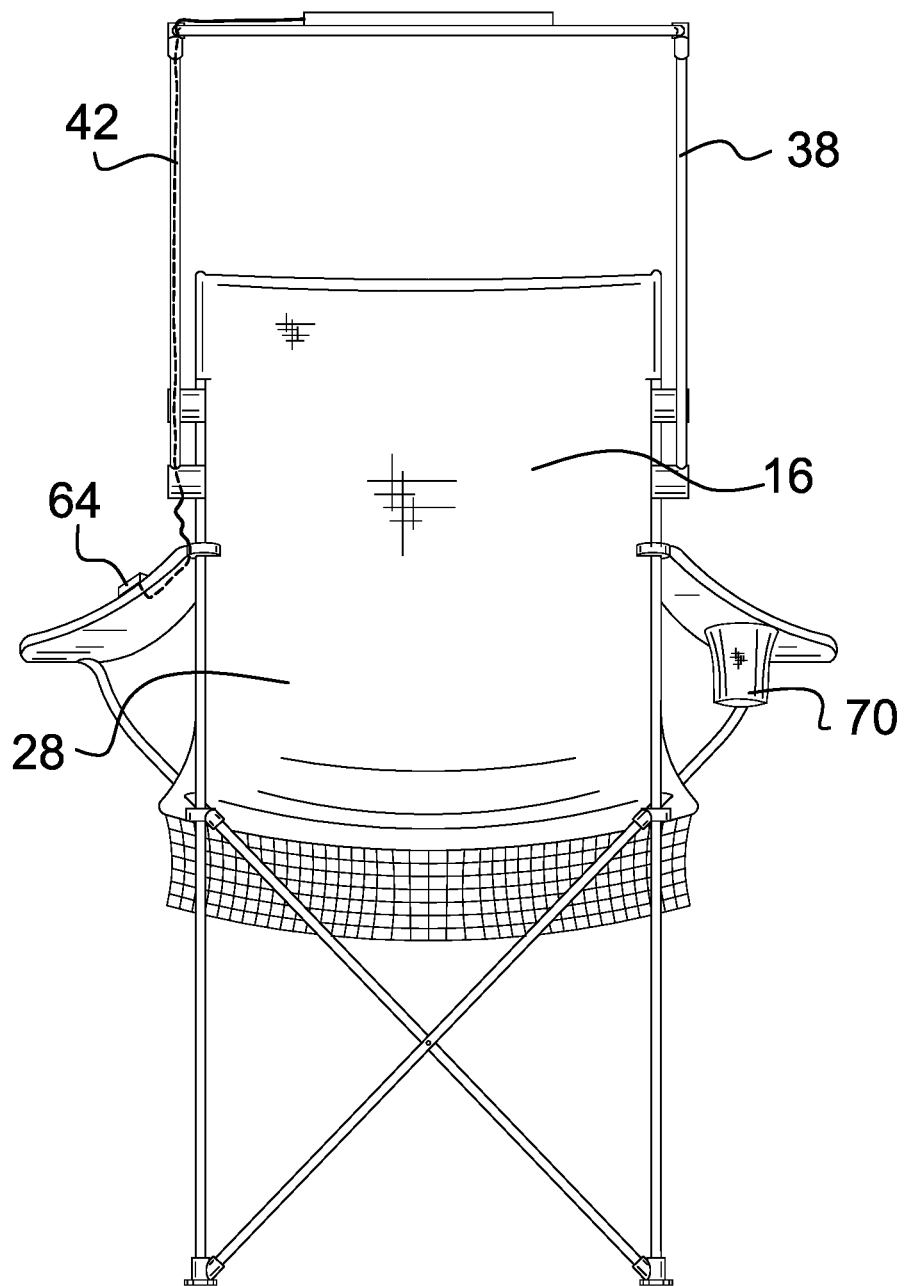
FIG. 2 is a rear elevation view of an embodiment of the disclosure.
Figure 3:
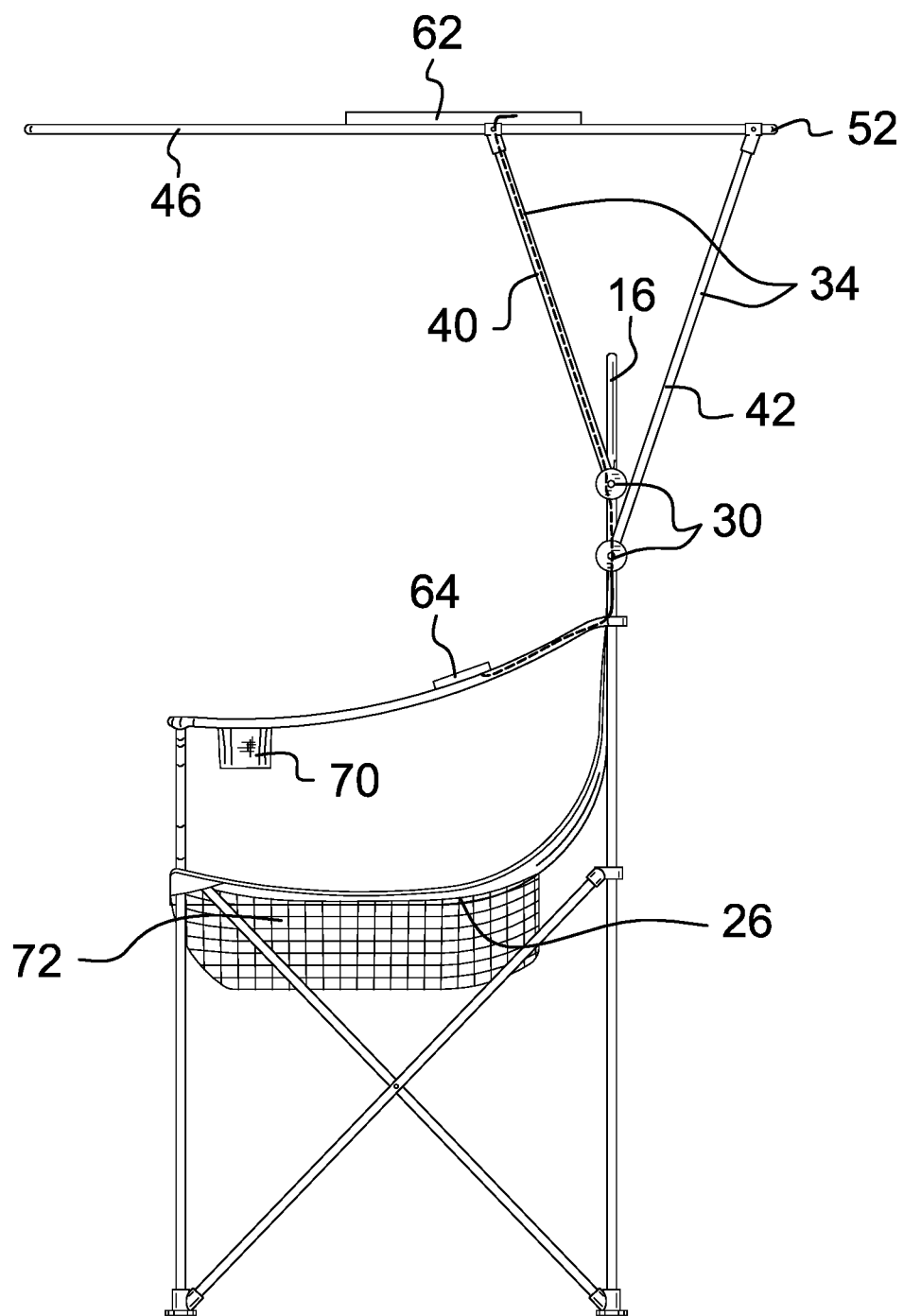
FIG. 3 is a side elevation view of an embodiment of the disclosure.
Figure 4:
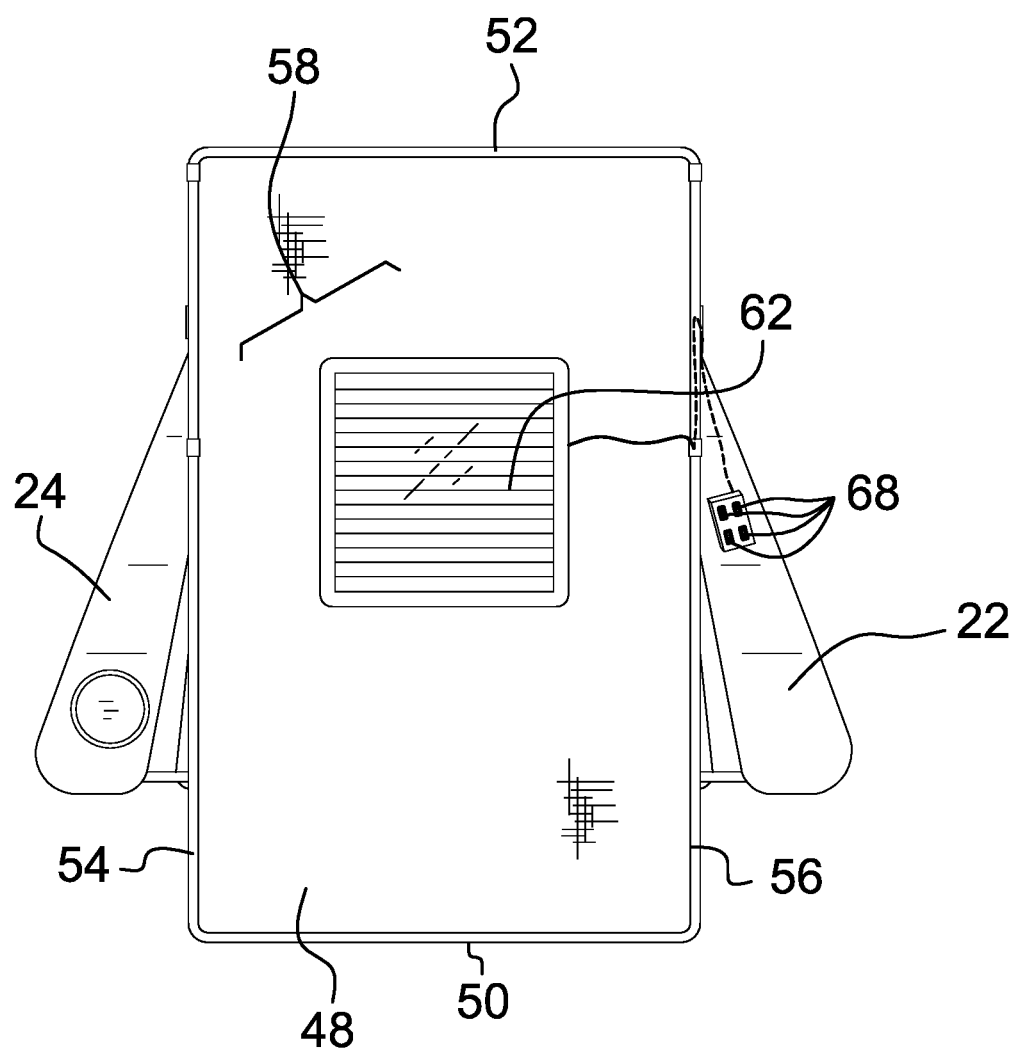
FIG. 4 is a top plan view of an embodiment of the disclosure.
Figure 5:
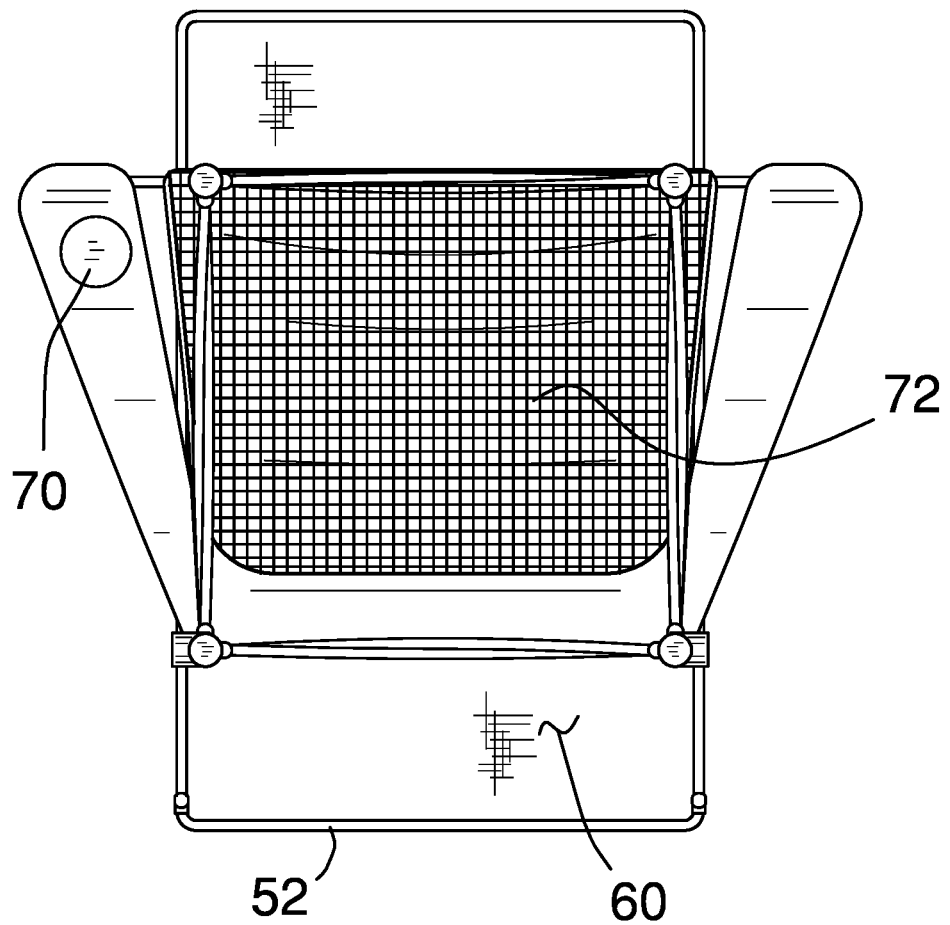
FIG. 5 is a bottom plan view of an embodiment of the disclosure.

With reference now to the drawings, and in particular to FIGS. 1 through 5 thereof, a new chair accessory embodying the principles and concepts of an embodiment of the disclosure and generally designated by the reference numeral 10 will be described.

As best illustrated in FIGS. 1 through 5, the collapsible chair and solar panel shade charger system 10 generally comprises a chair 12 having a seat bottom 14, a seat back 16, a pair of arms 18, and a plurality of legs 20. A plurality of carry straps may be coupled to the chair 12. The pair of arms 18 comprises a left arm 22 and a right arm 24. The seat bottom 14 has an underside 26. The chair 12 may be, but is not limited to, a folding camp chair 28, a beach chair, or a lounge chair. The chair 12 is weatherproof. A plurality of cylindrical hinges 30 may be coupled to the seat back 16 of the chair. A mounting means 32 is coupled to the chair 12. The mounting means 32 may be a four-bar linkage mechanism 34 comprising a right front bar 36, a right rear bar 38, a left front bar 40, and a left rear bar 42. A sun shade 44 is coupled to the mounting means 32. The sun shade 44 may comprise a shade frame 46 and a shade 48. The shade frame 46 has a front side 50, a back side 52, a right side 54, and a left side 56. The shade 48 extends from the front side 50 to the back side 52 and from the right side 54 to the left side 56. The shade 48 has a top side 58 and a bottom side 60. Each of the right rear bar 38 and the left rear bar 42 is coupled to the shade frame 46 proximal the back side 52 and extends to the seat back 16 of the chair. Each of the right front bar 36 and the left front bar 40 is coupled to the right side 54 and the left side 56 of the shade frame, respectively, and extends to the seat back 16 of the chair above the right rear bar 38 and the left rear bar 42, respectively. Each of the right front bar 36, the right rear bar 38, the left front bar 40, and the left rear bar 42 is coupled to the plurality of cylindrical hinges 30 to allow the sun shade 44 to be foldable behind the seat back 16.

A solar panel 62 is removably coupled to the top side 58 of the shade so it may be detached and stored or replaced. A charger housing 64 is coupled to the left arm 22 of the chair. A plurality of ports 66 is coupled to the charger housing 64. The plurality of ports 66 is in operational communication with the solar panel 62 by a plurality of sealed wires 67 and is configured to receive a plurality of charging cables to charge personal electronic devices. The plurality of ports 66 may be a set of four USB ports 68. A cup holder 70 may be coupled to the right arm 24 of the chair. A storage net 72 may be coupled to the underside 26 of the seat bottom and is configured to hold items such as sun screen, cell phones, magazines, and sun glasses.

In use, the chair 12 is positioned in the sun and the sun shade 44 is positioned to create shade over the seat bottom and the seat back to shade a user. The solar panel 62 then draws energy from the sun that the user may harness via the plurality of ports 66 to charge her plurality of personal electronic devices.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A collapsible chair and solar panel shade charger system comprising:
    a chair, the chair having a seat bottom, a seat back, a pair of arms, and a plurality of legs;
    a mounting means coupled to the chair, the mounting means being foldably coupled to the seat back of the chair;
    a sun shade coupled to the mounting means, the sun shade having a top side and a bottom side;
    a solar panel coupled to the sun shade, the solar panel being removably coupled to the top side;
    a charger housing coupled to the chair;
    a plurality of ports coupled to the charger housing, the plurality of ports being in operational communication with the solar panel, the plurality of ports being configured to receive a plurality of charging cables to charge personal electronic devices; and
    a storage net coupled to the chair, the storage net being coupled to an underside of the seat bottom such that the storage net is positioned directly beneath the seat bottom, the storage net extending from a forwardmost edge of the seat bottom towards a rear side of the seat bottom and extending fully across the seat bottom between lateral sides of the seat bottom.

2. The collapsible chair and solar panel shade charger system of claim 1 further comprising the sun shade comprising a shade frame and a shade, the shade frame having a front side, a back side, a right side, and a left side, the shade extending from the front side to the back side and from the right side to the left side.

3. The collapsible chair and solar panel shade charger system of claim 2 further comprising the mounting means being a four-bar linkage mechanism, the four-bar linkage mechanism comprising a right front bar, a right rear bar, a left front bar, and a left rear bar, each of the right rear bar and the left rear bar being coupled to the shade frame proximal the back side and extending to the seat back of the chair, each of the right front bar and the left front bar being coupled to the right side and the left side of the shade frame, respectively, and extending to the seat back of the chair above the right rear bar and the left rear bar, respectively, each of the right front bar, the right rear bar, the left front bar, and the left rear bar being hingably coupled to the seat back.

4. The collapsible chair and solar panel shade charger system of claim 3 further comprising a plurality of cylindrical hinges coupled to the seat back of the chair, each of the right front bar, the right rear bar, the left front bar, and the left rear bar being coupled to the plurality of cylindrical hinges.

5. The collapsible chair and solar panel shade charger system of claim 1 further comprising the charger housing being coupled to a left arm of the pair of arms of the chair.

6. The collapsible chair and solar panel shade charger system of claim 5 further comprising the plurality of ports being a set of four USB ports.

7. The collapsible chair and solar panel shade charger system of claim 5 further comprising a cup holder coupled to a right arm of the pair of arms.

8. A collapsible chair and solar panel shade charger system comprising:
    a chair, the chair having a seat bottom, a seat back, a pair of arms, and a plurality of legs, the pair of arms comprising a left arm and a right arm, the seat bottom having an underside;
    a plurality of cylindrical hinges coupled to the chair, the plurality of cylindrical hinges being coupled to the seat back;
    a mounting means coupled to the chair, the mounting means being a four-bar linkage mechanism, the four-bar linkage mechanism comprising a right front bar, a right rear bar, a left front bar, and a left rear bar;
    a sun shade coupled to the mounting means, the sun shade comprising a shade frame and a shade, the shade frame having a front side, a back side, a right side, and a left side, the shade extending from the front side to the back side and from the right side to the left side, the shade having a top side and a bottom side, each of the right rear bar and the left rear bar being coupled to the shade frame proximal the back side and extending to the seat back of the chair, each of the right front bar and the left front bar being coupled to the right side and the left side of the shade frame, respectively, and extending to the seat back of the chair above the right rear bar and the left rear bar, respectively, each of the right front bar, the right rear bar, the left front bar, and the left rear bar being coupled to the plurality of cylindrical hinges;
    a solar panel coupled to the sun shade, the solar panel being removably coupled to the top side;
    a charger housing coupled to the chair, the charger housing being coupled to the left arm;
    a plurality of ports coupled to the charger housing, the plurality of ports being in operational communication with the solar panel, the plurality of ports being configured to receive a plurality of charging cables to charge personal electronic devices, the plurality of ports being a set of four USB ports;

a cup holder coupled to the chair, the cup holder being coupled to the right arm; and a storage net coupled to the chair, the storage net being coupled to the underside of the seat bottom such that the storage net is positioned directly beneath the seat bottom, the storage net extending from a forwardmost edge of the seat bottom towards a rear side of the seat bottom and extending fully across the seat bottom between lateral sides of the seat bottom.

\* \* \* \* \*